March 31, 1970    G. LANZONI    3,503,422
MULTI-WAY VALVE DEVICE FOR ADJUSTING HEAT EXCHANGE APPARATUS
Filed June 8, 1967

INVENTOR.
Gianluigi LANZONI
BY

United States Patent Office 3,503,422
Patented Mar. 31, 1970

3,503,422
MULTI-WAY VALVE DEVICE FOR ADJUSTING
HEAT EXCHANGE APPARATUS
Gianluigi Lanzoni, Via Civitali 13, Milan, Italy
Filed June 8, 1967, Ser. No. 644,676
Claims priority, application Italy, June 10, 1966,
18,863/66
Int. Cl. F16k 11/06, 1/44, 19/00
U.S. Cl. 137—625.29          1 Claim

ABSTRACT OF THE DISCLOSURE

The present invention relates to a multi-way valve device particularly for heat exchange such as radiators, comprising a valve body defining inside thereof a longitudinal cavity containing two perforated cross-seats which divide the cavity into three compartments, four cross-holes for communication with outer pipes opening into the longitudinal cavity and a plugging body movable between the said perforated cross-seats and adapted to close the said perforated seats, the said plugging body actuated by an externally accessible rod-like element.

BACKGROUND OF THE INVENTION

Four-way valves for mixing delivery and return water in big branches of hot water heating pipes are known. These valves are mounted on heating plants and comprise a body member wherein four apertures are formed one of which is for delivering and another for returning the liquid. Within the said body member by means of a control a throttle plugging body is provided which is adapted to convey the liquid to the other two apertures connected either to the radiator element or to the boiler, in order to mix the hot liquid in the delivery duct with the cooler liquid in the return duct.

Three-way valves also exist which are intended to be arranged at the radiator entrance. Such valve types, however, have the inconvenience, that when the radiator is included, cooled still water, i.e., water which easily cools, remains in a few ducts. Accordingly when all the radiators are in an opened condition, unbalance occurs in the system.

The main object of this invention is to provide an adjusting valve device which on the one hand may be mounted onto single radiators and on the other permits circuits without branches containing still water to be obtained.

Another object of this invention is to provide a valve device adapted to accomplish an adjusting operation in a simple way.

Another object of the invention is to provide a valve device of simple and stout structure.

SUMMARY OF THE INVENTION

These and still other objects which will be better apparent below are attained by a multi-way valve device, particularly for heat-exchangers such as radiators, for mounting between delivery and return ducts, comprising a valve body, a longitudinal cavity in said body, at least two spaced valve seats within said cavity dividing the said cavity into a corresponding number of compartments communicating to one another through said valve seats, a plurality of lateral holes in said valve body for communication of the said compartments with the said delivery and return ducts, a plugging member slidably mounted between said valve seats for alternatingly closing said valve seats, and actuating means for said plugging member arranged on the said valve body.

According to a characteristic feature the valve device comprises a top-threaded valve, a handwheel keyed onto the said upper valve, a rod-like element, and a plugging member mounted on the said rod-like element and arranged inside the said cavity, and a seat separating the second and subsequent apertures.

BRIEF DESCRIPTION OF THE DRAWINGS

Further characteristics and advantages of the invention will be better evident from the description of a preferred but not exclusive embodiment of the valve device illustrated by way of a nonlimiting example in the accompanying drawing in which.

DESCRIPTION OF THE PREFERRED EMBODIMENTS

Figure 2:
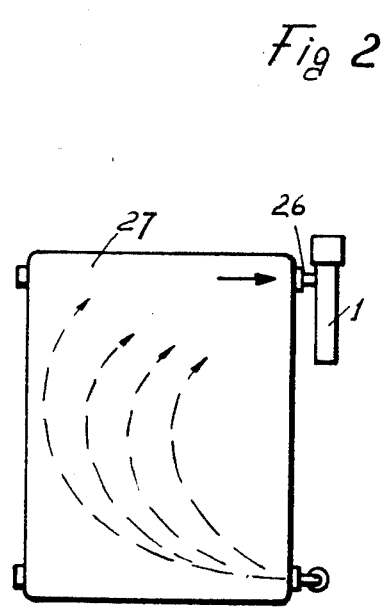
FIG. 2 is a vertical longitudinal sectional view of the said device.

With reference to the drawing, the valve device comprises a valve body 1, defining inside thereof a longitudinal and suitably shaped cavity 2.

In the lower portion of body 1 said cavity 2 has a longitudinal hole 4, which in operative condition, is closed by a threaded plug (not shown in the drawing). The longitudinal cavity 2 is divided into three compartments 7, 8 and 9 by two cross-seats 5 and 6, having circular holes formed therein indicated at 5' and 6', respectively.

Figure 3:
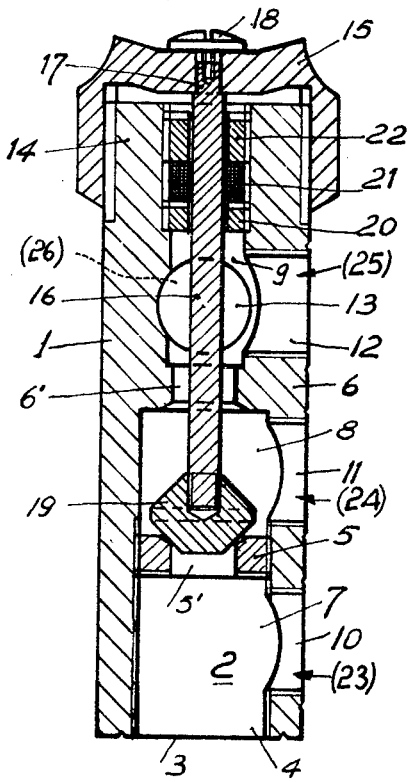
FIGS. 3 and 4 show diagrammatically in a smaller scale the valve device mounted on a radiator element.
Figure 4:
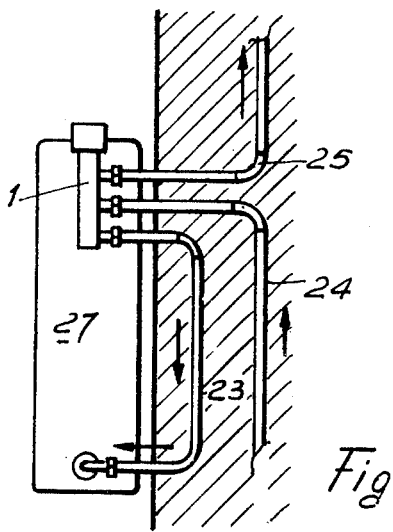
Figure 1:
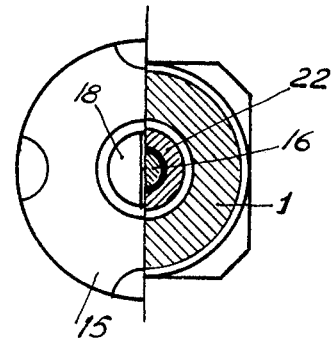
FIG. 1 is a plant view, partly in section, of a valve device according to the invention.

The cross-holes 10, 12 and 13 which are also formed on the body 1 and serve to provide communication to the outer ducts 23, 24, 25 and 26, respectively, as shown in FIGS. 3 and 4, communicate with the portions 7, 8 and 9, respectively. of longitudinal cavity 2.

The top portion 14 of the valve body 1 is threaded so as to be screwed into a handwheel 15, rigid with the top end of a rod-like element 16 through a square hole 17 and the locking screw 18.

The rod-like element 16 has at the lower end a blocked plugging member 19 which is movable within the cavity 8 from the cross-seat 5 to the cross-seat 6 and which can close the respective holes 5' and 6'.

The hydraulic seal of the rod-like element 16 is secured through ring 20, gasket 21 and locking nut 22.

In FIGURE 4 there are represented on outer feed duct 24, a discharge duct 25 and duct 23 for connection to radiator 27.

In FIGURE 3 the tubular element 26 is shown which constitutes a passage for the liquid from the radiator 27 to the valve and discharge duct 25.

The exclusion and insertion of the radiator element 27 occur by means of the appropriate displacement of the plugging body 19 in the portion 8 of the cavity 2, which displacement being obtained through a corresponding rotation of the handwheel 15. When such a plugging member 19 closes the hole 5' of the cross-seat 5 the hot liquid flowing from the pipe 24 and the feed hole 11 passes through hole 6' into the portion 9 of the cavity 2 and from there, through the discharge hole 12 is passes directly to the waste pipe 25. The radiator element 27 remains excluded in this case.

If by an appropriate rotation of the handwheel 15 the plugging member 19 rises, until it closes the hole 6' of the cross-seat 6 all the hot liquid coming from the feed pipe 24 passes through the hole 5' into the portion 7 of the cavity 2 and thence through the hole 10 and the pipe 23 to the radiator element 27 and having been used it passes from the radiator element and through the discharge 26 of the radiator element 27 enters into the valve device through the hole 13 from whence it enters into the cavity 9 and from there through the hole 12 it enters into the waste pipe 25. In this case the radiator element is completely inserted. The plugging member 19 can occupy, in the cavity 2, an infinity of positions between the two extremes already described thus causing a corresponding insertion of the radiator element 27, that is gradually adjustable heating according to desire by an appropriate rotation of the handwheel 15.

The four-way valve, according to the present invention results in easy and efficient application and such as to comply with the requirements of use of such types of valves when installed in central heating systems.

I claim:

1. A four-way valve device with a valve member and four connections for heating units, in which two connections are directed to an inlet and an outlet of the heating unit and the other two connections to an inflow and an outflow pipe of the heating system and having means providing communication of the heating unit with the supply and the outflow pipe in a first position of the valve member, direct communication between said inflow pipe and said outflow pipe in a second position of the valve member and communication between the heating unit, the inflow pipe and the outflow pipe in intermediate positions of said valve member, wherein, according to the improvement, said valve device comprises an elongated valve body, a longitudinal cavity in said body, two longitudinally spaced inner flange formations in said cavity dividing said cavity into three compartments, means defining lateral holes on the same side of said elongated valve body opening at one end into each of said compartments, and opening at the other end thereof into said inlet connection of the heating unit, said inflow pipe and said outflow pipe respectively, said holes having axes laying in a common plane parallel to the longitudinal extension of said cavity means defining a further hole in a side wall of said valve body and opening into one of said compartments connected with said outflow pipe, said further hole having a center line forming an angle with said common plane and opening with one end thereof into said outlet connection of said heating unit and opening with the other end thereof into said outflow pipe, said valve member being arranged in the intermediate of said compartments and having a valve surface on one end thereof facing one of said flange formations and having another valve surface on the opposite end thereof and facing the other of said flange formations, said flange formations having valve seats cooperating with the valve surfaces of said valve member, the distance between said valve seats being substantially greater than the distance between said valve surfaces.

References Cited

UNITED STATES PATENTS

| | | | |
|---|---|---|---|
| 306,880 | 10/1884 | Wallace | 137—599.1 |
| 2,169,043 | 8/1939 | Goehring | 137—599.1 |
| 2,443,679 | 6/1948 | Glantzer | 137—599.1 |
| 2,987,077 | 6/1961 | Stucklin | 137—625.29 X |

FOREIGN PATENTS 383,004  12/1907  France.

ARNOLD ROSENTHAL, Primary Examiner